118,040

UNITED STATES PATENT OFFICE.

ANGELO MOLFINO, OF NEW YORK, N. Y., ASSIGNOR TO THE UNITED STATES CARTRIDGE COMPANY, OF LOWELL, MASSACHUSETTS.

IMPROVEMENT IN GUNPOWDERS.

Specification forming part of Letters Patent No. 118,040, dated August 15, 1871.

*To all whom it may concern:*

Be it known that I, ANGELO MOLFINO, of the city, county, and State of New York, have invented a new and Improved Composition of Matter for use as Gunpowder; and I do hereby declare that the following is a full and exact description thereof, of its composition, and of the method of preparing the same.

The powder is composed of chlorate of potash, starch, and charcoal. The starch made from wheat is the best for my purpose, and is the kind used by me in the composition of the powder. The components may be used in different proportions, and will produce powder of varying power according to the proportional parts of each used. The proportions which give the best results are the following: Seven hundred and seventy-two parts, by weight, of chlorate of potash to two hundred and twenty-eight parts of starch, with one hundred and fifty parts of charcoal added thereto. If less chlorate of potash be used a powder of less power will be produced.

The composition is prepared by first triturating each of the three ingredients, and then thoroughly mixing them in the desired proportions, or they may be first mixed and then triturated.

If it is desired to form the powder in grains, it may be wet so as to form a paste, either while being triturated or afterward, and then broken into grains of different sizes in the same manner as ordinary gunpowder is prepared.

The advantages of this powder over the ordinary gunpowder are: First, it possesses double the power. Second, it does not foul the gun or cannon, and does not leave so much residuum or moisture. Third, it makes less smoke and of a lighter quality. Fourth, the smoke and gas are less suffocating. Fifth, the powder can be manufactured, transported, and handled with less danger. Sixth, the ingredients can be mixed at the time it is desired to use the powder, except when grained powder is desired. Seventh, it can be manufactured as cheaply.

What I claim as my invention, and desire to secure by Letters Patent, is—

A new and useful gunpowder composed of the following ingredients, viz., chlorate of potash, wheat-starch, and charcoal, combined substantially in the proportions specified.

ANGELO MOLFINO.

Witnesses:
A. F. BRETTON,
JAMES E. WHEELER.